(12) United States Patent
Szarejko et al.

(10) Patent No.: US 10,351,458 B2
(45) Date of Patent: Jul. 16, 2019

(54) MOULD FOR MANUFACTURING A MULTI-CURVED BELT GLASS PANEL

(71) Applicant: PRESS GLASS SPÓŁKA AKCYJNA, Nowa Weiś (PL)

(72) Inventors: Bogusław Szarejko, Gdynia (PL); Eugeniusz Ziółkowski, Gdańsk (PL)

(73) Assignee: PRESS GLASS SPÓŁKA AKCYJNA, Nowa Wieś (PL)

( * ) Notice: Subject to any disclaimer, the term of this patent is extended or adjusted under 35 U.S.C. 154(b) by 0 days.

(21) Appl. No.: 14/904,512

(22) PCT Filed: Mar. 28, 2014

(86) PCT No.: PCT/PL2014/050016
§ 371 (c)(1),
(2) Date: Jan. 12, 2016

(87) PCT Pub. No.: WO2014/182185
PCT Pub. Date: Nov. 13, 2014

(65) Prior Publication Data
US 2016/0145140 A1 May 26, 2016

(30) Foreign Application Priority Data
May 10, 2013 (PL) .................................. 122034 U

(51) Int. Cl.
*C03B 23/025* (2006.01)
*C03B 40/00* (2006.01)

(52) U.S. Cl.
CPC .......... *C03B 23/0252* (2013.01); *C03B 40/00* (2013.01)

(58) Field of Classification Search
None
See application file for complete search history.

(56) References Cited

U.S. PATENT DOCUMENTS 3,756,797 A * 9/1973 Akeyoshi et al. .. C03B 23/0252
65/107
4,529,433 A 7/1985 Bennett
(Continued)

FOREIGN PATENT DOCUMENTS

| DE | 10 2012 107 968 A1 | 3/2014 |
| EP | 2 167 435 B1 | 3/2010 |
| GB | 04402 | 5/1911 |

OTHER PUBLICATIONS

Machine Translation of DE 102012107968 A1. Original publication Mar. 6, 2014.*
(Continued)

*Primary Examiner* — Cynthia Szewczyk
(74) *Attorney, Agent, or Firm* — Horst M. Kasper, Esq

(57) ABSTRACT

The invention relates to the mold (1) for manufacturing a multi-curved bent glass panels comprising a stationary lower load-bearing structure (2) having defined longitudinal (2a), a transversal (2b) directions and vertical direction (2c) and provided with a supporting frame (4) and a number of contoured supports (5) mounted in the supporting frame (4) in the vertical and parallel arrangement to each other and having its upper edges shaped in waves; wherein the supports (5) are arranged in such an order, that their upper edges form a predetermined bending surface, curved along at least one of the longitudinal (2a) and transversal (2b) directions and alternately upwards and downwards in the vertical direction (2c), having variable curvature and the depth of the curve.

4 Claims, 3 Drawing Sheets

(56) References Cited

U.S. PATENT DOCUMENTS

Figure 1:
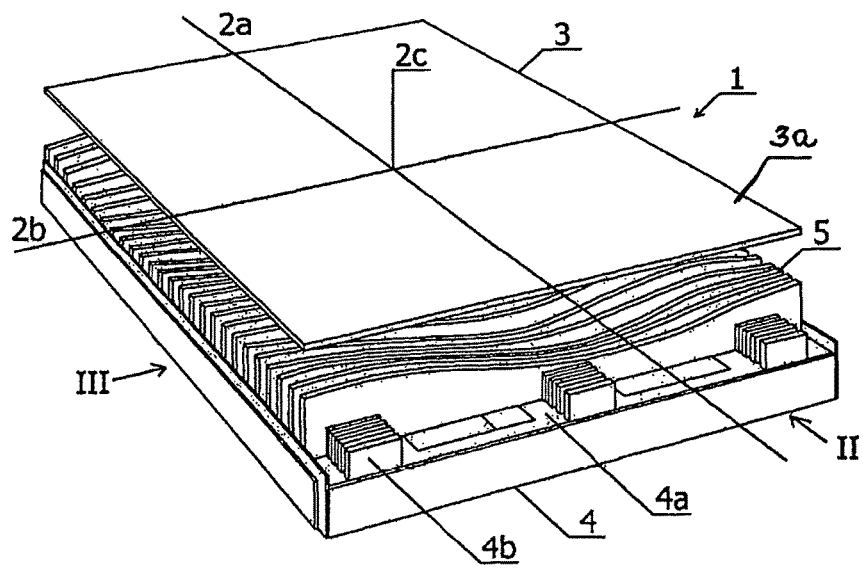

| | | | | |
|---|---|---|---|---|
| 4,973,344 A | * | 11/1990 | Rahrig | C03B 23/03 |
| | | | | 65/106 |
| 5,118,543 A | * | 6/1992 | McColl | C03B 23/0252 |
| | | | | 428/155 |
| 2010/0147030 A1 | * | 6/2010 | Rietbergen | C03B 23/0252 |
| | | | | 65/106 |
| 2013/0000357 A1 | * | 1/2013 | Sounni | C03B 23/0252 |
| | | | | 65/107 |

OTHER PUBLICATIONS

Full translation of Klein DE 102012107968A from German to English (Year: 2012).*

* cited by examiner

MOULD FOR MANUFACTURING A MULTI-CURVED BELT GLASS PANEL

The present invention refers to a mould for manufacturing a multi-curved bent glass panel designed particularly for facades of buildings.

In prior art it is known to curve the glass panels by the gravity force by means of concave or convex moulds comprising contoured supports, connected to each other by the laterally arranged supporting rods.

It is known from the patent specification EP 2167435 (B1) a mould for bidirectional bending of glass, comprising stationary lower load-bearing structure including separate supports mounted on the supporting beams, which are parallel to each other. Upper edges of the supports are contoured concavely and they form together a forming surface of a fixed curved shape in two directions. Above the lower supporting structure is located an upper load-bearing structure, movable in the up and down directions, comprising rods, arranged side by side, susceptible to deformation when exposed to heat. Bending of the glass panel by means of this mould is executed by placing the selected supports of the lower load-bearing structure on the supporting frame, placing the upper load-bearing structure in the upper position, where the rods form a flat surface, placing the glass panel being formed on them, and subsequently heating the mould and forming the glass panel with simultaneous lowering the upper load-bearing structure with respect to the lower load-bearing structure to the lower position. In the lower position, due to the force of gravity exerted by the glass panel, the rods of the upper load-bearing structure, and with them the formed glass panel, adapt to the shape of the supports of the lower load-bearing structure, mirroring the surface defined by the upper edges of these supports.

Due to the use of the upper load-bearing structure consisting of the rods, the mould according to this solution limits the possibilities of bending the glass panel excluding the forms of multi-curved panels more diverse in the cross-section outline, which are very desirable in architectural applications. Moreover, the mould has complicated construction, including parts movable relative to each other, exposed to destruction and seizure due to temperatures occurring in the bending process.

The aim of the invention is to develop a mould for manufacturing a multi-curved bent glass panels which would enable unlimited, locally differentiated and changing continuously bending of the glass panel and at the same time the mould being simple in construction and operation.

According to the invention, the mould for manufacturing a multi-curved bent glass panels comprising: a stationary lower load-bearing structure having defined longitudinal and a transversal directions and vertical direction and provided with a supporting frame and a number of contoured supports mounted in the supporting frame in the vertical and parallel arrangement to each other; and an upper load-bearing structure being located on the supports for supporting the glass panel being formed, characterized in that the supports of the lower load-bearing structure have upper edges shaped in waves and the supports being arranged in such an order, that their upper edges form predetermined bending surface, curved along at least one of the longitudinal and transversal directions of the lower load-bearing structure and alternately upwards and downwards in the vertical direction, having variable curvature and the depth of the curve; and the upper load-bearing structure being a plate susceptible to deformation under the influence of the temperature, placed on the upper edges of the supports for supporting formed glass panel for bending.

The upper load-bearing structure may comprise underlay glass panel.

Advantageously the supporting frame comprises longitudinal beams provided with upwardly projecting holders, which are suitable for maintaining the supports in a predetermined vertical position.

Further advantageously, the supports are spaced apart in the lower load-bearing structure at intervals of 1 to 3 cm from each other.

Also advantageously the supports are made of refractory material, especially from ceramics.

The mould for manufacturing a multi-curved bent glass panels ensures obtaining fancifully, repeatedly and changeably curved glass panels, and the outline surfaces of such panels can be planned and manufactured in a predictable manner. The mould can be easy adapted to the modified outlines of manufactured glass panels, and if necessary enables also repetitive reproduction of the panels of the same outlines. Employing the glass panel as an upper load-bearing structure enables using also this underlay panel in particular applications, for example architectural applications, or ensures easy recycling, melting in glass furnaces and re-use of the material.

Figure 2:
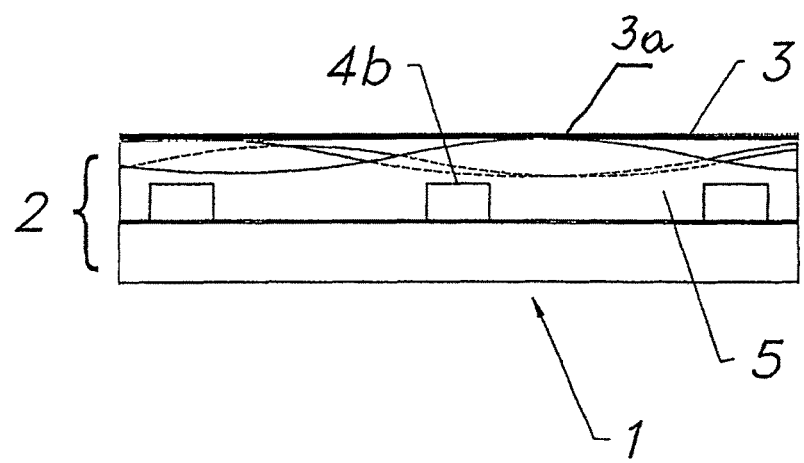
Figure 3:
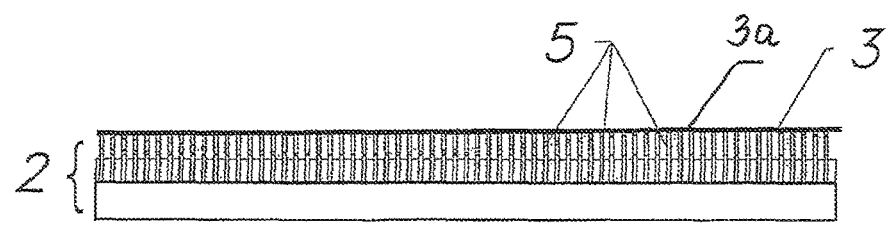
Figure 4:
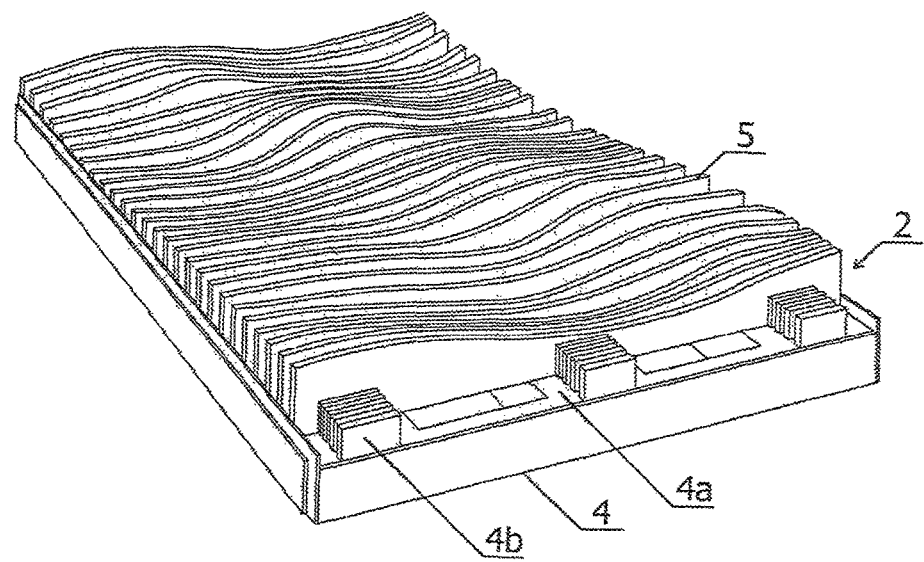

The subject of the invention is shown on the accompanying drawing where FIG. 1 shows a perspective view of the mould for manufacturing a multi-curved bent glass panel, FIG. 2 shows a side view of the mould of FIG. 1 in the direction II on FIG. 1, FIG. 3 shows a side view of the mould of FIG. 1 in the direction III on FIG. 1, FIG. 4 shows the perspective view of the lower load-bearing structure of FIGS. 1-3, FIG. 5 shows the perspective view of the mould with bent glass panel after completion of the forming process, with a part of the upper load-bearing structure removed for the clarity.

The mould 1 for manufacturing a multi-curved bent glass panel, according to the invention, as presented on FIGS. 1-4, comprises a stationary lower load-bearing structure 2, having defined longitudinal direction 2a and transversal direction 2b. Lower load-bearing structure 2 comprises a supporting frame 4 and contoured supports 5, mounted removably on the supporting frame 4 vertically and parallel to each other, maintaining intervals between the supports 5. Removable mounting of the supports 5 in the lower load-bearing structure 2 enables exchanging these supports 5 as required.

The supporting frame 4 has any structure ensuring solid and removable embedding of the supports 5 in the frame. For example, as shown on the figures the supporting frame 4 comprises longitudinal beams 4a provided with upwardly projecting holders 4b, suitable for maintaining the supports 5 in a predetermined vertical position.

According to the invention, the supports 5 of the lower load-bearing structure 2 have upper edges shaped in waves and the supports 5 are arranged in such an order, that they form predetermined bending surface, curved along at least one of the longitudinal 2a and transversal 2b directions of the lower load-bearing structure 2, alternately upwards and downwards in the vertical direction 2c, having variable curvature and the depth of the curve.

The supports 5 are spaced apart in the lower load-bearing structure 2 at intervals of 1 to 3 cm from each other depending on the thickness of the glass panel to be bent and desirable appearance of the final surface of curved glass panel (complexity of the shape of the surface).

The supports 5 are made of rigid refractory material, especially of ceramics.

On the supports 5 of the lower load-bearing structure 2, a flat upper load-bearing structure 3 is provided used for supporting glass panel 6 to be bent. The upper load-bearing structure 3 is a plate susceptible to deformation under the influence of the temperature, and it is particularly preferred that it is the underlay glass panel 3a.

Before bending the glass panel the mould is prepared by mounting properly contoured supports 5 on the supporting frame 4 of the lower load-bearing structure 2, in the predefined sequence, ensuring obtaining curved surface of required shape. Shaping of the supports 5 and their arrangement in the lower load-bearing structure 2 of the mould is executed by using computerized methods. The upper load-bearing structure 3 in the form of a plate, especially underlay glass panel 3a, is placed on the supports 5 set together on the lower load-bearing structure 2 and the glass panel 6, to be bent, is laid on this underlay glass panel 3a. In order to facilitate separating ready glass panel 6 from the plate of the upper load-bearing structure 3, especially from the underlay glass panel 3a, the upper load-bearing structure 3 is covered by the separation substance, for example such one as known in the glass industry.

Figure 5:
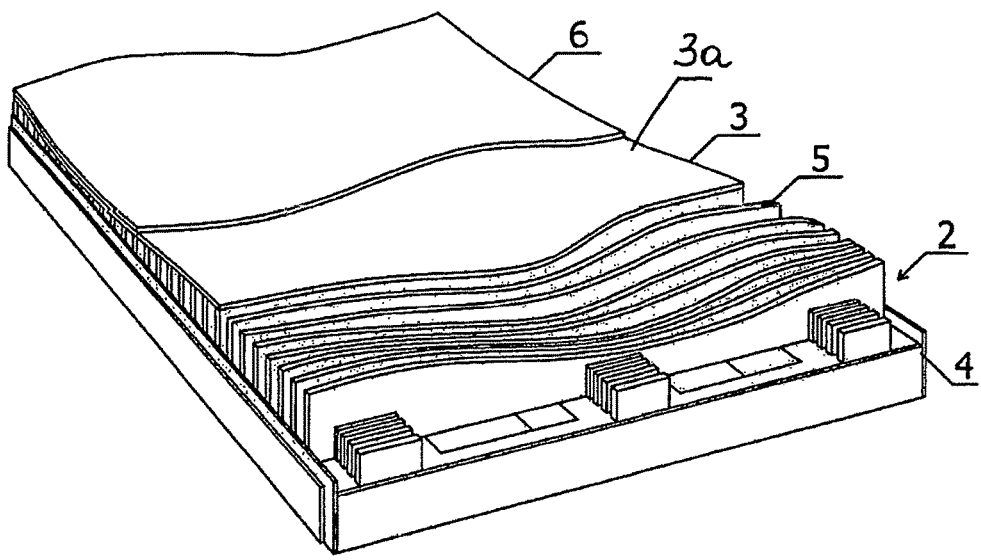

The mould 1 together with formed glass panel 6 is subjected to heat in the temperatures of 550-750° C. As a result of the softening of the plate forming the upper load-bearing structure 3 and glass panel 6 being formed, and as a result of the gravity force, the plate and the panel adopt the shape of the surface defined by the upper edges of the supports 5 of the lower load-bearing structure 2. The plate of the upper load-bearing structure 3, especially underlay glass panel 3a, ensures that the deformations from the upper edges of the supports 5, arising on the lower surface of the glass panel 6, are eliminated. The mould with curved glass panel is shown in FIG. 5, where for better illustration the part of the upper load-bearing structure 3 and ready curved glass panel 6 were cut out.

The invention claimed is:

1. A mold (1) for manufacturing a multi-curved bent glass panels comprising:

a stationary lower load-bearing structure (2) provided with:
 a supporting frame (4); and
 a number of supports (5) are removably mounted in the supporting frame (4) in the vertical and parallel arrangement to each other; and
 an upper load-bearing plate (3) being located on the supports (5) of the stationary lower load-bearing structure (2) for supporting a glass panel (6) being formed
 wherein
 the supports (5) of the lower load-bearing structure (2) have its upper edges shaped in waves and the supports (5) are arranged in series parallel to each other in such an order, where their upper edges form a predetermined bending surface, curved glass panel, wherein
  the upper load-bearing plate (3) is a plate susceptible to deformation under the influence of the temperature, placed on the mentioned upper edges of the supports (5) and it is covered with separation substance, wherein the upper load-bearing plate (3) may optionally comprise an underlay glass panel (3a), covered with separation substance, where the supporting frame (4) comprises longitudinal beams (4a) characterized in that longitudinal beams (4a) are provided with series parallel to each other retaining elements (4b) projecting upwardly, which are suitable for maintaining the supports (5) in a predetermined vertical position, wherein the distance between adjacent retaining elements (4b) corresponds to the thickness of the supports (5) where the lower edge of each support (5) is inserted between the two retaining elements (4b) in each series of retaining elements (4b).

2. The mold according to claim 1, characterized in that the supports (5) are spaced apart in the lower load-bearing structure (2) at intervals of 1 to 3 cm from each other.

3. The mold according to claim 1, characterized in that the supports (5) are made of refractory material.

4. The mold according to claim 3, wherein the supports (5) are made of refractory ceramics.

* * * * *